United States Patent
Wang et al.

(10) Patent No.: US 7,151,143 B2
(45) Date of Patent: *Dec. 19, 2006

(54) BLENDS CONTAINING MACROCYCLIC POLYESTER OLIGOMER AND HIGH MOLECULAR WEIGHT POLYMER

(75) Inventors: Yi-Feng Wang, Waterford, NY (US); Steven R. Bahr, Schenectady, NY (US); Paul Willey, Clifton Park, NY (US); Tohru Takekoshi, Scotia, NY (US); Sunita S. Baghel, Loudonville, NY (US); Steven J. Winckler, Troy, NY (US)

(73) Assignee: Cyclics Corporation, Schenectady, NY (US)

( * ) Notice: Subject to any disclaimer, the term of this patent is extended or adjusted under 35 U.S.C. 154(b) by 189 days.

This patent is subject to a terminal disclaimer.

(21) Appl. No.: 10/860,431

(22) Filed: Jun. 3, 2004

(65) Prior Publication Data
US 2004/0220334 A1    Nov. 4, 2004

Related U.S. Application Data

(63) Continuation-in-part of application No. 10/408,753, filed on Apr. 7, 2003, now Pat. No. 6,994,914, which is a continuation of application No. 10/195,853, filed on Jul. 15, 2002, now Pat. No. 6,639,009, which is a continuation of application No. 09/754,943, filed on Jan. 4, 2001, now Pat. No. 6,420,047, which is a continuation-in-part of application No. 09/535,132, filed on Mar. 24, 2000, now Pat. No. 6,369,157.

(60) Provisional application No. 60/177,727, filed on Jan. 21, 2000.

(51) Int. Cl.
    *C08F 20/00*    (2006.01)

(52) U.S. Cl. .............. 525/437; 525/438; 525/439; 525/441; 525/444; 525/445; 524/399; 524/435

(58) Field of Classification Search ............... 525/437, 525/438, 439, 441, 444, 445; 524/399, 435
See application file for complete search history.

(56) References Cited

U.S. PATENT DOCUMENTS 2,628,171 A    2/1953    Green .................. 106/271

(Continued)

FOREIGN PATENT DOCUMENTS

BE    676324    6/1966

(Continued)

OTHER PUBLICATIONS

U.S. Appl. No. 10/102,162, filed Mar. 20, 2002, Wang et al.

(Continued)

*Primary Examiner*—Samuel A. Acquah
(74) *Attorney, Agent, or Firm*—Goodwin Procter LLP (57) ABSTRACT

The invention provides blends of macrocyclic polyester oligomer (MPO) with high-molecular-weight polymer and polymerization catalyst as friable, one-component, ready-to-polymerize materials with long shelf life. The invention also provides methods for preparation and use of the blend materials. The blends are used, for example, in the production of thermoplastics via low-pressure processes, such as rotational molding and powder coating, without modification of existing equipment. The blends are particularly useful where it is desired to exploit the ability to polymerize and crystallize MPO isothermally, but where the melt viscosity of unfilled MPO is too low for use in existing equipment.

36 Claims, 2 Drawing Sheets

ROTATIONAL MOLDING PROCESS

U.S. PATENT DOCUMENTS

| | | | |
|---|---|---|---|
| 3,018,272 A | 1/1962 | Griffing et al. ............... 260/75 |
| 3,090,753 A | 5/1963 | Matuszak et al. |
| 3,786,067 A | 1/1974 | Throckmorton et al. ..... 260/327 |
| 4,559,262 A | 12/1985 | Cogswell et al. |
| 4,568,703 A | 2/1986 | Ashida |
| 4,590,259 A | 5/1986 | Kosky et al. ................. 528/272 |
| 4,605,731 A | 8/1986 | Evans et al. ................. 528/371 |
| 4,616,077 A | 10/1986 | Silva ........................... 528/371 |
| 4,638,077 A | 1/1987 | Brunelle et al. ............. 558/281 |
| 4,644,053 A | 2/1987 | Brunelle et al. ............. 528/371 |
| 4,680,345 A | 7/1987 | Kobayashi et al. .......... 525/437 |
| 4,727,134 A | 2/1988 | Brunelle et al. ............. 528/371 |
| 4,740,583 A | 4/1988 | Brunelle et al. ............. 528/370 |
| 4,757,132 A | 7/1988 | Brunelle et al. ............. 528/357 |
| 4,785,060 A | 11/1988 | Nagler ........................ 525/444 |
| 4,803,288 A | 2/1989 | Kitamura et al. ............ 549/267 |
| 4,816,548 A | 3/1989 | Evans et al. ................. 528/370 |
| 4,829,144 A | 5/1989 | Brunelle et al. ............. 528/176 |
| 4,831,001 A | 5/1989 | Evans et al. ................. 502/153 |
| 4,888,411 A | 12/1989 | Shannon et al. ............. 528/199 |
| 4,889,885 A | 12/1989 | Usuki et al. |
| 4,900,706 A | 2/1990 | Sasaki et al. |
| 4,904,810 A | 2/1990 | Brunelle et al. ............. 558/281 |
| 4,909,846 A | 3/1990 | Barfurth et al. |
| 4,980,453 A | 12/1990 | Brunelle et al. ............. 528/352 |
| 4,992,228 A | 2/1991 | Heck et al. .................. 264/135 |
| 4,999,420 A | 3/1991 | Leitz et al. .................. 528/371 |
| 5,006,637 A | 4/1991 | Guggenheim et al. ....... 528/355 |
| 5,019,450 A | 5/1991 | Cogswell et al. |
| 5,023,346 A | 6/1991 | Schon et al. ................. 549/231 |
| 5,039,717 A | 8/1991 | Kawakami et al. .......... 523/100 |
| 5,039,783 A | 8/1991 | Brunelle et al. ............. 528/272 |
| 5,071,711 A | 12/1991 | Heck et al. ............... 428/542.8 |
| 5,095,088 A | 3/1992 | Wang .......................... 528/203 |
| 5,097,008 A | 3/1992 | Krabbenhoft et al. ....... 528/371 |
| 5,116,900 A | 5/1992 | Flautt et al. ................. 524/377 |
| 5,191,013 A | 3/1993 | Cook et al. .................. 524/601 |
| 5,191,038 A | 3/1993 | Krabbenhoft et al. ....... 525/462 |
| 5,202,386 A | 4/1993 | Hogt et al. |
| 5,207,850 A | 5/1993 | Parekh ........................ 156/166 |
| 5,214,158 A | 5/1993 | Brunelle et al. ............. 549/267 |
| 5,225,129 A | 7/1993 | van den Berg ................ 264/85 |
| 5,231,161 A | 7/1993 | Brunelle et al. ............. 528/272 |
| 5,237,042 A | 8/1993 | Kim et al. .................... 528/279 |
| 5,241,880 A | 9/1993 | Mizobata et al. .......... 74/502.5 |
| RE34,431 E | 11/1993 | Brunelle et al. ............. 528/352 |
| 5,264,548 A | 11/1993 | Brunelle et al. ............. 528/371 |
| 5,281,669 A | 1/1994 | Kambour et al. ............ 525/177 |
| 5,288,837 A | 2/1994 | Munjal et al. ............... 528/198 |
| 5,300,392 A | 4/1994 | Odell et al. .................. 430/130 |
| 5,300,393 A | 4/1994 | Odell et al. .................. 430/134 |
| 5,300,590 A | 4/1994 | Cook et al. .................. 525/444 |
| 5,302,484 A | 4/1994 | Odell et al. .................. 430/127 |
| 5,591,800 A | 4/1994 | Odell et al. .................. 524/783 |
| 5,314,779 A | 5/1994 | Odell et al. .................. 430/127 |
| 5,321,117 A | 6/1994 | Brunelle ...................... 528/272 |
| 5,340,909 A | 8/1994 | Doerr et al. .................. 528/276 |
| 5,348,985 A | 9/1994 | Pearce et al. ................. 521/124 |
| 5,356,984 A | 10/1994 | Carbone et al. ............. 524/431 |
| 5,386,037 A | 1/1995 | Takekoshi et al. ........... 549/206 |
| 5,387,666 A | 2/1995 | Takekoshi et al. ........... 528/283 |
| 5,389,719 A | 2/1995 | Takekoshi et al. ........... 524/784 |
| 5,407,984 A | 4/1995 | Brunelle et al. ............. 524/178 |
| 5,410,014 A | 4/1995 | Haese et al. ................. 528/196 |
| 5,420,226 A | 5/1995 | Hamer et al. ................ 528/201 |
| 5,434,244 A | 7/1995 | Warner et al. ............... 528/490 |
| 5,446,122 A | 8/1995 | Warner et al. ............... 528/279 |
| 5,466,744 A | 11/1995 | Evans et al. ................. 524/714 |
| 5,498,651 A | 3/1996 | Brunelle ...................... 524/176 |
| 5,519,108 A | 5/1996 | Yuo et al. |
| 5,527,976 A | 6/1996 | Takekoshi et al. ............. 585/16 |
| 5,530,052 A | 6/1996 | Takekoshi et al. ........... 524/447 |
| 5,605,979 A | 2/1997 | Priddy, Jr. et al. ........... 525/439 |
| 5,637,655 A | 6/1997 | Priddy, Jr. et al. ........... 525/438 |
| 5,646,306 A | 7/1997 | Elsasser, Jr. ................. 549/267 |
| 5,648,454 A | 7/1997 | Brunelle ...................... 528/491 |
| 5,654,395 A | 8/1997 | Jackson et al. ........... 528/308.3 |
| 5,656,700 A | 8/1997 | Kagi et al. |
| 5,661,214 A | 8/1997 | Brunelle et al. ............. 524/783 |
| 5,663,282 A | 9/1997 | Todt et al. ................... 528/274 |
| 5,668,186 A | 9/1997 | Brunelle et al. ............... 521/48 |
| 5,693,722 A | 12/1997 | Priddy, Jr. et al. ........... 525/439 |
| 5,700,888 A | 12/1997 | Hall ............................ 526/190 |
| 5,707,439 A | 1/1998 | Takekoshi et al. ........... 106/483 |
| 5,710,086 A | 1/1998 | Brunelle et al. ............. 502/171 |
| 5,756,644 A | 5/1998 | Hodge et al. ................ 528/272 |
| 5,760,161 A | 6/1998 | Goins, Jr. et al. ........... 528/299 |
| 5,786,440 A | 7/1998 | Kohler et al. ................ 528/196 |
| 5,795,423 A | 8/1998 | Johnson ...................... 156/166 |
| 5,830,541 A | 11/1998 | Carswell et al. ............. 427/475 |
| 5,869,586 A | 2/1999 | Riedel et al. |
| 5,936,029 A | 8/1999 | Hall ............................ 524/572 |
| 5,968,642 A | 10/1999 | Saito ........................ 428/304.4 |
| 6,080,834 A | 6/2000 | Putzig et al. ................. 528/279 |
| 6,121,466 A | 9/2000 | Osterholt et al. ............ 549/267 |
| 6,124,412 A | 9/2000 | Bin-Taleb et al. |
| 6,284,868 B1 | 9/2001 | Geprags et al. |
| 6,297,330 B1 | 10/2001 | Burch, Jr. et al. ........... 525/444 |
| 6,353,030 B1 | 3/2002 | Prikoszovich |
| 6,369,157 B1 * | 4/2002 | Winckler et al. ............ 524/783 |
| 6,376,026 B1 | 4/2002 | Correll et al. ............... 427/512 |
| 6,414,103 B1 | 7/2002 | Correll et al. ................. 528/25 |
| 6,420,047 B1 * | 7/2002 | Winckler et al. ............ 428/480 |
| 6,420,048 B1 | 7/2002 | Wang .......................... 428/480 |
| 6,432,486 B1 | 8/2002 | Paris et al. |
| 6,436,548 B1 | 8/2002 | Phelps ........................ 428/480 |
| 6,436,549 B1 | 8/2002 | Wang .......................... 428/480 |
| 6,458,972 B1 | 10/2002 | Surburg et al. |
| 6,525,164 B1 | 2/2003 | Faler ........................... 528/279 |
| 6,586,558 B1 | 7/2003 | Schmidt et al. |
| 6,639,009 B1 * | 10/2003 | Winckler et al. ............ 524/783 |
| 6,646,134 B1 | 11/2003 | Brugel |
| 6,670,429 B1 | 12/2003 | Appelman et al. |
| 6,806,346 B1 | 10/2004 | Brugel |
| 2004/0155380 A1 | 8/2004 | Kendall et al. |

FOREIGN PATENT DOCUMENTS

| | | |
|---|---|---|
| CN | 1120555 | 4/1996 |
| DE | 3607627 | 9/1987 |
| DE | 4034574 A1 | 5/1992 |
| EP | 0000544 B1 | 8/1982 |
| EP | 0153785 A2 | 9/1985 |
| EP | 0216496 A2 | 4/1987 |
| EP | 0153785 B1 | 7/1989 |
| EP | 419234 A2 | 3/1991 |
| EP | 486832 A2 | 5/1992 |
| EP | 264835 B1 | 6/1992 |
| EP | 235741 B1 | 1/1993 |
| EP | 543492 A1 | 5/1993 |
| EP | 589640 A1 | 3/1994 |
| EP | 598604 A1 | 5/1994 |
| EP | 601753 A1 | 6/1994 |
| EP | 635512 A1 | 1/1995 |
| EP | 655476 A1 | 5/1995 |
| EP | 436186 B1 | 10/1995 |
| EP | 688778 A1 | 12/1995 |
| EP | 0714926 A2 | 6/1996 |
| EP | 699701 A3 | 9/1996 |
| EP | 0798336 A2 | 1/1997 |
| EP | 0 594 385 | 5/2003 |
| EP | 1 308 208 | 5/2003 |
| EP | 1 354 908 | 10/2003 |
| EP | 01968581 | 11/2003 |

| | | |
|---|---|---|
| EP | 1 378 540 | 1/2004 |
| EP | 01942649 | 1/2004 |
| EP | 1 420 036 | 5/2004 |
| EP | 02756358 | 5/2004 |
| EP | 1 475 402 | 11/2004 |
| EP | 03714278.3-2102 | 11/2004 |
| EP | 01968413 | 12/2004 |
| EP | 02734665 | 12/2004 |
| FR | 2 530 628 | 1/1984 |
| GB | 798412 | 8/1954 |
| GB | 957841 | 5/1964 |
| GB | 991020 | 5/1965 |
| GB | 1044205 | 9/1966 |
| GB | 1108921 | 4/1968 |
| GB | 1273225 | 5/1972 |
| GB | 1349324 | 4/1974 |
| GB | 2 123 405 A | 2/1984 |
| JP | 4621873 | 6/1971 |
| JP | 476425 | 10/1972 |
| JP | 57-122078 A | 7/1982 |
| JP | 6275547 | 4/1987 |
| JP | 62141063 A | 6/1987 |
| JP | 63156824 A | 11/1988 |
| JP | 02298512 | 12/1990 |
| JP | 4253764 | 9/1992 |
| JP | 08-093594 | 4/1996 |
| JP | 09048876 | 2/1997 |
| JP | 09-110832 | 4/1997 |
| JP | 09-238806 | 9/1997 |
| JP | 10-069915 | 3/1998 |
| JP | 10-194262 | 7/1998 |
| JP | 11-136942 | 5/1999 |
| JP | 2001031846 | 2/2001 |
| JP | 2002293902 | 10/2002 |
| JP | 2002293903 | 10/2002 |
| JP | 2002308969 | 10/2002 |
| JP | 2002317041 | 10/2002 |
| JP | 02320499 | 11/2002 |
| JP | 02322272 | 11/2002 |
| JP | 02338672 | 11/2002 |
| JP | 2003 082 081 | 3/2003 |
| SU | 1077893 | 3/1984 |
| SU | 1532560 A1 | 12/1989 |
| WO | 88/06605 | 9/1988 |
| WO | 91/09899 | 7/1991 |
| WO | 93/04106 | 3/1993 |
| WO | 95/00574 | 1/1995 |
| WO | 95/30702 | 11/1995 |
| WO | 96/22319 | 7/1996 |
| WO | 99/25485 | 5/1999 |
| WO | 00/27632 | 5/2000 |
| WO | 00/38897 | 7/2000 |
| WO | 01/53379 A1 | 7/2001 |
| WO | 2001/053379 | 7/2001 |
| WO | 01/56694 A1 | 8/2001 |
| WO | 02/18476 A2 | 3/2002 |
| WO | 02/22738 A2 | 3/2002 |
| WO | 2002/018476 | 3/2002 |
| WO | 2002/022738 | 3/2002 |
| WO | 02/098946 A1 | 12/2002 |
| WO | 2002/098946 | 12/2002 |
| WO | 2002/098947 | 12/2002 |
| WO | 03/031496 A1 | 4/2003 |
| WO | 2003/031059 | 4/2003 |
| WO | 2003/002551 | 10/2003 |
| WO | 2003/080705 | 10/2003 |
| WO | 2004/058471 | 7/2004 |
| WO | 2004/058854 | 7/2004 |
| WO | 2004/058868 | 7/2004 |
| WO | 2004/058872 | 7/2004 |
| WO | 2004/060640 | 7/2004 |

OTHER PUBLICATIONS

U.S. Appl. No. 10/040,530, filed Jan. 7, 2002, Wang.
U.S. Appl. No. 09/974,722, filed Oct. 9, 2001, Phelps et al.
U.S. Appl. No. 09/945,233, filed Aug. 31, 2001, Faler.
U.S. Appl. No. 09/906,385, filed Jul. 16, 2001, Wang.
U.S. Appl. No. 09/874,706, filed Jun. 5, 2001, Wang.
U.S. Appl. No. 09/754,943, filed Jan. 04, 2001, Winckler et al.
U.S. Appl. No. 09/659,975, filed Sep. 12, 2000, Phelps.
Ahjopalo, L. et al. (2000) "Cyclic Oligomers in Saturated Polyesters" Polymer, vol. 41, No. 23, 8283-8290.
Beach, A. Christopher G. "The Preparation of Mirrors by Sputtering Metals onto Glass Surfaces," *A. Inst. P.*, Chelsea Polytechnic, M.S, received, Mar. 17, 1930.
Brunelle (1995) "Macrocycles For The Synthesis of High Molecular Weight Polymers" pp. 197-235, ch. 6, New Methods of Polymer Synthesis: vol. 2, edited by J.R. Ebdon and G.C. Eastmond.
Brunelle et al, (1997) "Semi-crystalline Polymers via Ring-Opening Polymerization: Preparation and Polymerization of Alkylene Phthalate Cyclic Oligomers" *Polymers Preprints* vol. 38, No. 2, pp. 381-382.
Brunelle et al. (1998) "Semicrystalline Polymers via Ring-Opening Polymerization: Preparation and Polymerization of Alkylene Phthalate Cyclic Oligomers" *Macromolecules* vol. 31, No. 15, 4782-4790.
Burch, R. R. et al. (2000) "Synthesis of Cyclic Oligoesters and Their Rapid Polymerization to High Molecular Weight" Macromolecules, vol. 33, No. 14, 5053-5064.
Chisholm et al. "Syntheses and structural characterization of 2,2'-methylene-bis(6-t-butyl-4-methyl-phenoxide) complexes of titanium, zirconium and tantalum," *Polyhedron*, vol. 16, No. 17, (1997) pp. 2941-2949.
Cotton, N. J. et al. (1993) "Rate and Extent of Supercritical Fluid Extraction of Cyclic Trimer from Poly(Ethylene Terephthalate) at Elevated Temperatures" *Journal of Chromatographic Science*, vol. 31, No. 5, 157-161.
Cussler et al. "Barrier Membranes," *Journal of Membrane Science*, 38 (1988) pp. 161-174.
Durfee et al. "Chemical and Electrochemical Reduction of Titanium (IV) Aryloxides," *Inorganic Chemistry*, 24 (1985) pp. 4569-4573.
Fantacci et al. "Density Functional Study of Tetraphenolate and Calix[4]arene Complexes of Early Transition Metals," *Inorganic Chemistry*, 40 (2001) pp. 1544-1549.
Fukushima et al. "Graphite Nanoplatelets as Reinforcements for Polymers: Structural, Electrical and Thermal Properties," *Proc. 2nd Ann, Automotive Comp. Conf., Soc. Plast. Eng.*, Sep. 2002, 7 pgs.
Fukushima et al. "Synthesis of an Intercalated Compound of Montmorillonite and 6-Polyamide," *Journal of Inclusion Phenomena*, 5 (1987) pp. 473-482.
Hall et al. "Recent research on the synthesis and applications of cyclic oligomers," *Reactive & Functional Polymers*, 41 (1999), pp. 133-139.
Hamb et al. "Synthesis of Cyclic Tris(Ethylene Terephthalate)," *Polymer Letters*, 5 (1967), pp. 1057-1058.
Hamilton et al. (1998) "Cyclic Polyesters: Part 8. Preparation and Characterization of Cyclic Oligomers in Six Aromatic Ester and Ether-Ester Systems" *Polymer* vol. 39, No. 14., 3241-3252.
Harrison, A. G. et al. (1997) "Analysis of cyclic oligomers of poly(ethylene terephthalate) by liquid chromatography/mass spectrometry" Polymer Communications, vol. 38, No. 10, 2549-2555.
Henshaw et al. (1994) "Recycling of a Cyclic Thermoplastic Composite Material by Injection and Compression Molding" *J. of Thermoplastic Composite Materials* vol. 7 (1), 14-29.
Hubbard, P. A. (1996) "Polyesters via Macrocyclic Oligomers" Dissertation presented at the University of Akron.
Kricheldorf, H. R. et al. (1997) "Macrocycles IV. Macrocyclic Polylactones as Bifunctional Monomers for Polycondensations" *Journal of Polymer Science*, vol. 36, No. 9, 1373-1378.
Kricheldorf, H. R. et al. (1998) "Macrocycles. 3. Telechelic Polylactones via Macrocyclic Polymerization" Macromolecules, vol. 31, No. 3, 614-620.

Lattimer et al. (1998) "MALDI-MS Analysis of Pyrolysis Products From a Segmented Polyurethane" *Journal of Analytical and Applied Pyrolysis*, vol. 48, 1-15.

Lui et al. (1999) "Preparation of Cyclic Polyester Oligomers and Ultra-Low VOC Polyester Coatings" *Polymer Reprints*, vol. 40, No. 1, pp. 137-138.

Martin et al. (1987) "Pultrusion", *Engineered Materials Handbook; vol. 1 Composites*, pp. 533-543.

Miller, S. (1998) "Macrocyclic polymers from cyclic oligomers of poly(butylene terephthalate)" Dissertation Presented at University of Massachusetts, Amherst, MA US.

Mueller, F. J. et al. (1983) "Synthesis of Cyclic Oligomers of Butylene Terephthalate" *Makromol. Chem.*, vol. 184, No. 12, 2487-95.

Mueller, F. J. et al. (1983) "Synthesis of Cyclic Oligomers of Butylene Terephthalate" *Makromol. Chem.*, vol. 184, No. 12, 2487-95. (Translation).

Okuda et al. "Synthesis and Characterization of Mononuclear Titanium Complexes Containing a Bis(phenoxy) Ligand Derived from 2,2'-Methylene-bis(6-tert-butyl-4-methylphenol)," *Chem. Ber.*, vol. 128, (1995) pp. 221-227.

Perovic, A. (1985) "Morphological Instability of poly(ethylene terephthalate) cyclic oligomer crystals" *Journal of Material Science*, vol. 20, Iss. 4, 1370-1374.

Perovie et al. (1982) "Crystallization of Cyclic Oligomers in Commercial Poly(ethlenetereplithalate) Films" *Polymer Bulletin* vol. 6, 277-283.

Roelens, S. (1988) "Organotin-Mediated Synthesis of Macrocyclic Polyesters: Mechanism and Selectivity in the Reaction of Dioxastannolanes with Diacyl Dichlorides" *Journal of the Chemical Society, Perkin Transactions 2*, vol. 8, 1617-1625.

Ruddick et al. "A new method for the polymer-suported synthesis of cyclic oligoesters for potential applications in macrocyclic lactone synthesis and combinatorial chemistry," *J. Chem. Soc., Perkin Trans. 1*, 2002, pp. 627-637.

Spanagel et al. "Macrocyclic Esters," Contribution No. 153 from The Experimental Station of E.I. duPont deNemours &Company, vol. 57, pp. 929-934.

Toth et al. "Towards supported catalyst models: the synthesis, characterization, redox chemistry, and structures of the complexes $Ti(Oar')_4$ $(Ar' = C_6I\,I_4(2\text{-}t\text{-}Bu), C_6H(2,3,5,6\text{-}Me)_4)$," *Canadian Journal of Chemistry*, vol. 69, (1991) pp. 172-178.

Uhi et al. "Flame Retarduncy of Graphite Nanocomposites," *Polym. Mater. Sci. Eng.* 83:56(2000).

Usuki et al. "Swelling behavior of montmorillonite cation exchanged for ω-amino acids by ε-caprolactam," *J. Mater. Res.*, vol. 8, No. 5, May 1993, pp. 1174-1178.

Usuki et al. "Synthesis of nylon 6-clay hybrid," J. Mater. Res., vol. 8, No. 5, May 1993, pp. 1179-1184.

Ward et al. "Gas barrier improvement using vermiculite and mica in polymer films," *Journal of Membrane Science*, 55 (1991) pp. 173-180.

Xiao et al. "Preparation of exfoliated graphite/polystyrene composite by polymerization-filling technique," *Polymer*, 42 (2001) pp. 4813-4816.

Youk et al. "Polymerization of Ethylene Terephthalate Cyclic Oligomers with Antimony Trioxide," *Macromolecules*, 33 (2000), pp. 3594-3599.

A. Okada, et al., "Synthesis and Characterization of a Nylon 6-Clay Hybrid," *Polym. Prep.*, 28, 447, (1987).

Y. Kojima, et al., "Mechanical properties of nylon 6-clay hybrid," *J. Mater. Res.*, 8, 1185 (1993).

K.Yano, et al., "Synthesis and Properties of Polyimide-Clay Hybrid," *J. Ploym. Sci., Part A, Polym. Chem.*, 31, 2493 (1993).

P.D. Kaviratna, T. Lan, T.J. Pinnavaia, "Synthesis of Polyether-Clay Nanocomposites: Kinetics of Epoxide Self-Polymerization in Acidic Smectite Clays," *Polym. Prep.*, 31(1), 788 (1994).

P.B. Messersmith, E.P. Giannelis, "Polymer-Layered Silicate Nanocomposites: *In Situ* Intercalative Polymerization of ε-Caprolactone in Layered Silicates," *Chem. Mater.*, 5, 1064 (1993).

S.A. Bagshaw, E. Prouzet, T.J. Pinnavaia, "Templating of Mesoporous Molecular Sieves by Nonionic Polyethylene Oxide Surfactants," *Science*, 269, p. 1242, Sep. 1, 1995.

L.F. Nazar, H. Wu, W.P.Power, "Synthesis and Properties of a New $(PEO)_x [Na(H_2O)]_{0.25}MoO_3$ Nanocomposites," *J. Mater. res.*, 5(11), 1985 (1995).

F.J. Vankelecom, E. Merckx, M. Luts, J.B. Uytterhoeven, " Incorporation of Zeolites in polyimide Membranes," *J. Phys. Chem.*, 99, 13187 (1995).

J. Lee, T. Takekoshi, and E.P. Giannelis, "Fire Retardent Polyetherimide Nanocomposites," *Matter Res. Soc. Proc.*, 457, 513-518, (1997).

C.O. Oriakhi, M.M. Lerner, "Poly(Pyrrole) and Poly(Thiophene) / Clay Nanocomposites Via Latex-Colloid Interaction," *Mater. Res. Bull.*, 30, No. 6, p. 723, (1995).

Scatteria, L., Scarfato, P., Acierno, D., "Rheology of PBT-Layered Silicate Nanocomposites Prepared by Melt Compounding," *Plastics, Rubbers and Composites*, 33, 85-91 (2004) and references therein.

Tripathy, A.R., Burgaz, E., Kukureka, S.N., MacKnight, W.J., "Poly(Butylene Terephthalate) Nanocomposites Prepared by In-Situ Polymerization," *Macromolecules*, 36, 8593-5 (2003).

Lee, S.-S., Kim, J., "Synthesis of PET-Layered Silicate Nanocomposites Using Cyclic Ester Oligomers," *Polymeric Materials: Science and Engineering*, 89, 370-1 (2003).

* cited by examiner

FIG. 1 ROTATIONAL MOLDING PROCESS

FIG. 2  POWDER COATING PROCESS

US 7,151,143 B2

BLENDS CONTAINING MACROCYCLIC POLYESTER OLIGOMER AND HIGH MOLECULAR WEIGHT POLYMER

PRIOR APPLICATIONS

This application is a continuation-in-part of U.S. patent application Ser. No. 10/408,753, filed on Apr. 7, 2003, now U.S. Pat. No. 6,994,914, which is a continuation of U.S. patent application Ser. No. 10/195,853, filed on Jul. 15, 2002, and issued as U.S. Pat. No. 6,639,009, which is a continuation of U.S. patent application Ser. No. 09/754,943, filed on Jan. 4, 2001, and issued as U.S. Pat. No. 6,420,047, which is a continuation-in-part of U.S. patent application Ser. No. 09/535,132, filed on Mar. 24, 2000, and issued as U.S. Pat. No. 6,369,157, which claims benefit of U.S. Provisional Patent Application No. 60/177,727, filed on Jan. 21, 2000, the descriptions of which are incorporated by reference herein in their entirety. This application is related to the commonly-owned U.S. patent application Ser. No. 10/859,784 entitled, "Intimate Physical Mixtures Containing Macrocyclic Polyester Oligomer and Filler," by Takekoshi et al., filed on even date herewith, the description of which is incorporated by reference herein in its entirety. This application further claims benefit of and priority to commonly-owned U.S. Provisional Patent Application No. 60/530,942, filed on Dec. 19, 2003.

FIELD OF THE INVENTION

This invention relates generally to thermoplastics and articles formed therefrom. More particularly, in certain embodiments, the invention relates to blends of macrocyclic polyester oligomer and high molecular weight polymer.

BACKGROUND OF THE INVENTION

Macrocyclic polyester oligomer (macrocyclic oligoester, MPO) has unique properties that makes it attractive as a matrix-forming resin for engineering thermoplastic composites. MPO lends valuable characteristics to polymerized products, for example, high strength, high gloss, and solvent resistance. Furthermore, because certain MPO's melt and polymerize at temperatures well below the melting point of the resulting polymer, polymerization and crystallization can occur virtually isothermally upon melting of the MPO in the presence of an appropriate catalyst. The time and expense required to thermally cycle a tool is favorably reduced, because demolding can take place immediately following polymerization, without first cooling the mold.

MPO generally exhibits low melt viscosity. A low melt viscosity generally provides improved processing flexibility. For example, an MPO with a low melt viscosity can easily impregnate a dense fibrous preform. However, for certain low-pressure processes, such as rotational molding and powder coating, the melt viscosity of MPO may be too low to allow processing with existing process equipment. For example, the water-like viscosity of melted MPO may cause it to leak during rotational molding. In powder coating applications, the low melt viscosity of certain MPO's makes it difficult to control coating area and coating thickness, for example.

Use of a viscosity-enhancing agent along with an MPO during processing is generally not satisfactory, for example, because the agent may not mix well with the MPO, because a separate processing step is generally required to introduce the agent, and because the agent may have a deleterious effect on the properties of the material following polymerization of the MPO.

In addition to having low melt viscosities, MPO's are highly friable. This provides certain handling and processing advantages. For example, MPO may be easily crumbled, pulverized, or reduced to powder prior to and/or during processing. The friability of MPO provides a distinct advantage in low-pressure processes such as rotational molding and powder coating, where the form of the MPO prior to melting and polymerization is important. Adding agents to an oligomer to increase its melt viscosity generally results in a less friable mixture, making it difficult to use in processes such as rotational molding and powder coating.

Furthermore, in some applications, polymerization of MPO results in a brittle, highly crystalline material that is not as tough or ductile as desired. Modifying raw materials in order to increase the ductility and/or toughness of the resulting polymer may adversely affect the processibility of the raw materials, for example, by reducing the rate of polymerization.

Therefore, there exists a need for a raw material that is stable and friable under ambient conditions, that polymerizes and crystallizes isothermally, that has a sufficiently high rate of polymerization, and that can be used in low-pressure processes such as rotational molding and powder coating, without modification of existing equipment, to produce a product of sufficient toughness and ductility.

SUMMARY OF THE INVENTION

The invention provides blends of macrocyclic polyester oligomer (MPO) with high-molecular-weight polymer and polymerization catalyst as friable, one-part, ready-to-polymerize materials with long shelf life. Components manufactured from these blends exhibit improved ductility and toughness.

Blend materials of the invention are particularly well-suited for use in low-pressure processes such as rotational molding and powder coating, without modification of existing equipment. The presence of the polymer in the blend increases the melt viscosity of the blend without adversely affecting the friability of the blend, without significantly decreasing the rate of polymerization of the blend, and without affecting the ability of the blend to polymerize and crystallize essentially isothermally. Furthermore, the presence of high-molecular-weight polymer in the blend improves the toughness and ductility of the polymerized product.

This combination of attributes is unexpected, for example, because adding a viscosity-enhancing agent to a polymerization reaction mixture typically reduces its rate of polymerization and may unacceptably reduce the friability of the mixture prior to polymerization.

The invention provides methods for preparing the blends in order to adequately disperse the components without prematurely initiating polymerization. Blends prepared according to these methods exhibit long shelf lives and may be stored for weeks, months, or even years prior to use in a manufacturing process.

In one aspect, the invention provides a blend material stable at ambient conditions (at room temperature in air) for at least one week, the blend material including a macrocyclic polyester oligomer (MPO), a polymerization catalyst, and a polymer.

In one embodiment, the blend material includes a high molecular weight polymer having a weight average molecular weight ($M_w$) of at least about 5000 ($M_w$ may be lower than 5000 in some embodiments). Preferably, the weight average molecular weight of the polymer is at least about 50,000, and, more preferably, within a range from about 80,000 to about 120,000. Polymers with molecular weights above 120,000 may be used, as well. The polymer may be present in the blend material in an amount up to about 90 weight percent, up to about 75 weight percent, up to about 70 weight percent, up to about 50 weight percent, up to about 30 weight percent, or up to about 20 weight percent, for example, according to the type of MPO, polymer, and/or polymerization catalyst used, as well as the desired properties of the polymerized product. In one embodiment, the polymer is present in the blend in an amount from about 5 weight percent to about 20 weight percent. The polymer may be linear, branched, or cross-linked, and may include one or more polymeric species. In one embodiment, the polymer includes a polyester, a copolyester, a poly(vinyl butyral), and/or an acrylic polymer. The polymer may include a polyacetal, a polyether, an epoxide resin, a polycarbonate, an alkyd resin, and/or a polyallyl ester. More specifically, in one embodiment, the polymer includes one or more of the group consisting of poly(vinyl butyral-co-vinyl alcohol-co-vinyl acetate), poly(butyl methacrylate co-methyl methacrylate), poly[butylene terephthalate-co-poly(alkylene glycol) terephthalate], and poly(ethyl methacrylate co-glycidyl methacrylate). In one embodiment, the polymer includes polyethylene, either with or without at least one additional polymeric species. For example, an additional polymeric species may be used with polyethylene as a compatibilizer between the MPO (or its polymerization product) and the polyethylene.

The blend material has a higher viscosity than the macrocyclic polyester oligomer. In one embodiment, the viscosity of the blend is from about 5 times to about 5000 times the viscosity of the macrocyclic polyester oligomer. In one embodiment, the viscosity of the blend material at about 190° C. is at least about 100 centipoise (cP), and preferably, is within a range from about 100 cP to about 100,000 cP. Preferably, the blend material is friable.

The blend material includes a catalyst, yet is stable at ambient conditions for at least about one week. More preferably, the blend material is stable at least about one month, or at least about one year without requiring refrigeration and without requiring storage in the absence of oxygen. The catalyst preferably includes a tin compound and/or a titanate compound, and is preferably present in the blend in an amount from about 0.01 to about 10.0 mole percent per monomeric unit of the MPO.

The blend material includes a macrocyclic polyester oligomer (MPO). In one embodiment, the MPO includes a plurality of species. Species of MPO may differ from one another in the type and/or number of structural repeat units (i.e. monomeric units) contained. In one embodiment, the MPO includes a butylene terephthalate unit and an ethylene terephthalate unit. In one embodiment, the MPO includes about 95 mole percent butylene terephthalate units and about 5 mole percent ethylene terephthalate units.

In another aspect, the invention provides a method for preparing a friable blend material that is stable at ambient conditions for at least about one week, the method including the step of contacting an MPO, a polymer, and a polymerization catalyst at a temperature at which the MPO at least partially melts. In one embodiment, the MPO is at least partially melted prior to the contacting step. The MPO may be fully melted prior to the contacting step.

The contacting step may be performed in any number of stages. For example, in one embodiment, the method includes (a) contacting the MPO and the polymer at a first temperature where the MPO melts or at least temporarily remains melted, thereby forming a mixture of MPO and polymer; (b) cooling the mixture of MPO and polymer to a second temperature; and (c) adding the polymerization catalyst to the mixture. In one embodiment, the MPO is melted and mixed with polymer at a first temperature, then the mixture is cooled to a second temperature, at which point the polymerization catalyst is added. Here, the catalyst is added at a lower temperature in order to prevent (or reduce) premature polymerization of the MPO. In one embodiment, the step of contacting the MPO and polymer is performed at a first temperature from about 130° C. to about 250° C. In one embodiment, the MPO and polymer mixture is cooled to a temperature from about 10° C. to about 50° C. below the first temperature. The method may further include the step of solidifying the blend of the MPO, polymer, and polymerization catalyst and/or processing the blend to form a powder.

In yet another aspect, the invention provides a method for polymerizing an MPO, the method including the steps of: (a) providing a blend material that is stable at ambient conditions for at least one week, the blend material including an MPO, a polymerization catalyst, and a polymer; and (b) heating the blend material to polymerize the MPO. The blend material is preferably friable prior to the heating step. This provides improved handling and processibility, for example, in low-pressure processing methods. The method may be implemented as part of a manufacturing process including, for example, a rotational molding process, a powder coating process, a low-pressure molding process, a gas-assist molding process, a short-shot molding process, a co-injection molding process, a reaction-injection molding process, a blow molding process, a thermoforming process, or combinations thereof.

BRIEF DESCRIPTION OF THE DRAWINGS

The objects and features of the invention can be better understood with reference to the drawings described below, and the claims. The drawings are not necessarily to scale, emphasis instead being placed upon illustrating the principles of the invention.

DETAILED DESCRIPTION

The present invention provides a blend material that includes a macrocyclic polyester oligomer (MPO), a high molecular weight polymer, and a polymerization catalyst. Because it is a highly friable solid under ambient conditions, the blend material is easy to store, transport, and process. The blend material serves as a one-component, ready-to-polymerize mixture with a long shelf life. The blend material offers a higher viscosity than its constituent MPO, making it an attractive raw material for low-pressure processes such as rotational molding and powder coating. Furthermore, the blend material can be polymerized to produce a material, component, and/or article of manufacture with improved properties, for example, increased toughness and ductility.

The blend material may be converted into any solid form—for example, the blend material may be pelletized, sheeted, flaked, ground, pulverized, or otherwise converted into powdered form. Even though the material blend material contains a polymerization catalyst, the blend is surprisingly stable, and may be stored under ambient conditions for a period of about a week, about a month, about a year, or even longer, without prematurely polymerizing the MPO and without substantially deactivating the catalyst.

MPOs are highly friable, crystalline materials having very low melt viscosities. For example, the viscosity of macrocyclic poly(butylene terephthalate) oligomer is about 20 centipoise (cP) at 190° C. and about 400 cP at 150° C. For certain processing operations, it is desirable to use materials with higher viscosities, for example, within a range from about 100 cP to about 100,000 cP at 190° C., within a range from about 1000 cP to about 100,000 cP at 190° C., within a range from about 5000 cP to about 50,000 cP at 190° C., or within a range from about 10,000 cP to about 25,000 cP at 190° C. This is particularly true for processes such as rotational molding and powder coating, where existing equipment is designed for use with materials having higher viscosities.

It has been discovered that certain high molecular weight polymers can be combined with MPO and polymerization catalyst to form a blend material that is stable and friable under ambient conditions, that polymerizes and crystallizes isothermally, that has a sufficiently high rate of polymerization, and that can be used in low-pressure processes such as rotational molding and powder coating, without modification of existing equipment, to produce a product of sufficient toughness and ductility.

Throughout the description, where compositions, mixtures, blends, and composites are described as having, including, or comprising specific components, or where processes and methods are described as having, including, or comprising specific steps, it is contemplated that, additionally, there are compositions, mixtures, blends, and composites of the present invention that consist essentially of, or consist of, the recited components, and that there are processes and methods of the present invention that consist essentially of, or consist of, the recited processing steps.

It should be understood that the order of steps or order for performing certain actions is immaterial so long as the invention remains operable. Moreover, two or more steps or actions may be conducted simultaneously.

The following general definitions may be helpful in understanding the various terms and expressions used in this specification.

Definitions

As used herein, "macrocyclic" is understood to mean a cyclic molecule having at least one ring within its molecular structure that contains 5 or more atoms covalently connected to form the ring.

As used herein, an "oligomer" is understood to mean a molecule that contains one or more identifiable structural repeat units of the same or different formula.

As used herein, a "macrocyclic polyester oligomer" is understood to mean a macrocyclic oligomer containing structural repeat units having an ester functionality. A macrocyclic polyester oligomer typically refers to multiple molecules of one specific repeat unit formula. However, a macrocyclic polyester oligomer also may include multiple molecules of different or mixed formulae having varying numbers of the same or different structural repeat units. In addition, a macrocyclic polyester oligomer may be a co-polyester or multi-component polyester oligomer, i.e., an oligomer having two or more different structural repeat units having ester functionality within one cyclic molecule.

As used herein, "substantially homo- or co-polyester oligomer" is understood to mean a polyester oligomer wherein the structural repeat units are substantially identical or substantially composed of two or more different structural repeat units, respectively.

As used herein, an "alkylene group" is understood to mean —$C_nH_{2n}$—, where $n \geq 2$.

As used herein, a "cycloalkylene group" is understood to mean a cyclic alkylene group, —$C_nH_{2n-x}$—, where x represents the number of H's replaced by cyclization(s).

As used herein, a "mono- or polyoxyalkylene group" is understood to mean [—$(CH_2)_m$—O—]$_n$—$(CH_2)_m$—, wherein m is an integer greater than 1 and n is an integer greater than 0.

As used herein, a "divalent aromatic group" is understood to mean an aromatic group with links to other parts of the macrocyclic molecule. For example, a divalent aromatic group may include a meta- or para-linked monocyclic aromatic group (e.g., benzene).

As used herein, an "alicyclic group" is understood to mean a non-aromatic hydrocarbon group containing a cyclic structure within.

As used herein, a "$C_{1-4}$ primary alkyl group" is understood to mean an alkyl group having 1 to 4 carbon atoms connected via a primary carbon atom.

As used herein, a "$C_{1-10}$ alkyl group" is understood to mean an alkyl group having 1 to 10 carbon atoms, including straight chain or branched radicals.

As used herein, a "methylene group" is understood to mean —$CH_2$—.

As used herein, an "ethylene group" is understood to mean —$CH_2$—$CH_2$—.

As used herein, a "$C_{2-3}$ alkylene group" is understood to mean —$C_nH_{2n}$—, where n is 2 or 3.

As used herein, a "$C_{2-6}$ alkylene group" is understood to mean —$C_nH_{2n}$—, where n is 2–6.

As used herein, "substitute phenyl group" is understood to mean a phenyl group having one or more substituents. A substituted phenyl group may have substitution pattern that is recognized in the art. For example, a single substituent may be in the ortho, meta or para positions. For multiple substituents, typical substitution patterns include, for example, 2,6-, 2,4,6-, and, 3,5-substitution patterns.

As used herein, a "filler" is understood to mean a material other than a macrocyclic polyester oligomer or a polymerization catalyst that may be included in the blend material. A filler may be used to achieve a desired purpose or property, and may be present or be transformed into known and/or unknown substances in the resulting polyester polymer. For example, the purpose of the filler may be to provide stability, such as chemical, thermal, or light stability, to the blend material or the polyester polymer product, and/or to increase the strength of the polyester polymer product. A filler also may provide or reduce color, provide weight or bulk to achieve a particular density, provide reduced gas and vapor permeability, provide flame or smoking resistance (i.e., be a flame retardant), be a substitute for a more expensive material, facilitate processing, and/or provide other desirable properties. Illustrative examples of fillers are, among others, fumed silica, titanium dioxide, calcium carbonate, wollastonite, chopped fibers, fly ash, glass, glass fibers, glass microspheres, micro-balloons, crushed stone, nanoclay, linear polymers, and monomers.

The following headers are provided as a general organizational guide and do not serve to limit support for any given element of the invention to a particular section of the Description.

I. Macrocyclic Polyester Oligomer

One of the ingredients of the blend material of the invention is a macrocyclic polyester oligomer. Many different macrocyclic polyester oligomers can readily be made and are useful in the practice of this invention. Thus, depending on the desired properties of the final polyester polymer product, the appropriate macrocyclic polyester oligomer(s) can be selected for use in its manufacture.

Macrocyclic polyester oligomers that may be employed in this invention include, but are not limited to, macrocyclic poly(alkylene dicarboxylate) oligomers having a structural repeat unit of the formula:

where A is an alkylene, or a cycloalkylene or a mono- or polyoxyalkylene group; and B is a divalent aromatic or alicyclic group.

Preferred macrocyclic polyester oligomers include macrocyclic poly(1,4-butylene terephthalate) (PBT), poly(1,3-propylene terephthalate) (PPT), poly(1,4-cyclohexylene-dimethylene terephthalate) (PCT), poly(ethylene terephthalate) (PET), and poly(1,2-ethylene 2,6-naphthalenedicarboxylate) (PEN) oligomers, and copolyester oligomers comprising two or more of the above monomer repeat units.

Macrocyclic polyester oligomers may be prepared by known methods. Synthesis of the preferred macrocyclic polyester oligomers may include the step of contacting at least one diol of the formula HO-A-OH with at least one diacid chloride of the formula:

where A and B are as defined above. The reaction typically is conducted in the presence of at least one amine that has substantially no steric hindrance around the basic nitrogen atom. An illustrative example of such amines is 1,4-diazabicyclo[2.2.2]octane (DABCO). The reaction usually is conducted under substantially anhydrous conditions in a substantially water immiscible organic solvent such as methylene chloride. The temperature of the reaction typically is between about −25° C. and about 25° C. See, e.g., U.S. Pat. No. 5,039,783 to Brunelle et al.

Macrocyclic polyester oligomers have also been prepared via the condensation of a diacid chloride with at least one bis(hydroxyalkyl) ester such as bis(4-hydroxybutyl) terephthalate in the presence of a highly unhindered amine or a mixture thereof with at least one other tertiary amine such as triethylamine, in a substantially inert organic solvent such as methylene chloride, chlorobenzene, or a mixture thereof. See, e.g., U.S. Pat. No. 5,231,161 to Brunelle et al.

Another method for preparing macrocyclic polyester oligomers or macrocyclic copolyester oligomers is to depolymerize linear polyester polymers in the presence of an organotin or titanate compound. In this method, linear polyesters are converted to macrocyclic polyester oligomers by heating a mixture of linear polyesters, an organic solvent, and a trans-esterification catalyst such as a tin or titanium compound. The solvents used, such as o-xylene and o-dichlorobenzene, usually are substantially free of oxygen and water. See, e.g., U.S. Pat. No. 5,407,984 to Brunelle et al. and U.S. Pat. No. 5,668,186 to Brunelle et al.

Macrocyclic polyester oligomers (macrocyclic oligoesters) have been prepared from intermediate molecular weight polyesters by contacting a dicarboxylic acid or a dicarboxylate in the presence of a catalyst to produce a composition comprising a hydroxyalkyl-terminated polyester oligomer. The hydroxyalkyl-terminated polyester oligomer is heated to produce a composition comprising an intermediate molecular weight polyester which preferably has a molecular weight between about 20,000 Daltons and about 70,000 Daltons. The intermediate molecular weight polyester is heated and a solvent is added prior to or during the heating process to produce a composition comprising an MPO. See, e.g., U.S. Pat. No. 6,525,164, to Faler.

Macrocyclic polyester oligomers (macrocyclic oligoesters) that are substantially free from macrocyclic co-oligoesters have been prepared by depolymerizing polyesters using the organo-titanate catalysts described in co-owned U.S. patent application Ser. No. 09/974,722, by Phelps et al., published as U.S. Patent Application Publication No. US 2003/0114640, the text of which is incorporated by reference herein in its entirety.

It is also within the scope of the invention to employ macrocyclic homo- and co-polyester oligomers to produce homo- and co-polyester polymers, respectively. Therefore, unless otherwise stated, an embodiment of a composition, article, or process that refers to a macrocyclic polyester oligomer also includes a co-polyester embodiments.

In one embodiment, macrocyclic ester homo- and co-oligomers used in this invention include oligomers having a general structural repeat unit of the formula:

where A' is an alkylene, cycloalkylene, or mono- or polyoxyalkylene group, and where A' may be substituted, unsubstituted, branched, and/or linear. Example MPO's of this type include butyrolactone and caprolactone, where the degree of polymerization is one, and 2,5-dioxo-1,4-dioxane, and lactide, where degree of polymerization is two. The degree of polymerization may alternatively be 3, 4, 5, or higher. Molecular structures of 2,5-dioxo-1,4-dioxane and lactide, respectively, appear below:

In one embodiment, a macrocyclic polyester oligomer used in a blend material of the invention includes species of different degrees of polymerization. Here, a degree of polymerization (DP) with respect to the MPO means the number of identifiable structural repeat units in the oligomeric backbone. The structural repeat units may have the same or different molecular structure. For example, an MPO may include dimer, trimer, tetramer, pentamer, and/or other species.

II. Polymerization Catalyst

Polymerization catalysts employed in the invention are capable of catalyzing the polymerization of the macrocyclic polyester oligomer. As with state-of-the-art processes for polymerizing macrocyclic polyester oligomers, organotin and organotitanate compounds are the preferred catalysts, although other catalysts may be used. For example, organotin compound 1,1,6,6-tetra-n-butyl-1,6-distanna-2,5,7,10-tetraoxacyclodecane may be used as polymerization catalyst. Other illustrative organotin compounds include n-butyltin(IV) chloride dihydroxide, dialkyltin(IV) oxides, such as di-n-butyltin(IV) oxide and di-n-octyltin oxide, and acyclic and cyclic monoalkyltin (IV) derivatives such as n-butyltin tri-n-butoxide, dialkyltin(IV) dialkoxides such as di-n-butyltin(IV) di-n-butoxide and 2,2-di-n-butyl-2-stanna-1,3-dioxacycloheptane, and trialkyltin alkoxides such as tributyltin ethoxide. See, e.g., U.S. Pat. No. 5,348,985 to Pearce et al.

Also, trisstannoxanes having the general formula (I) shown below can be used as a polymerization catalyst to produce branched polyester polymers.

(I)

where $R_2$ is a $C_{1-4}$ primary alkyl group and $R_3$ is $C_{1-10}$ alkyl group.

Additionally, organotin compounds with the general formula (II) shown below can be used as a polymerization catalyst to prepare branched polyester polymers from macrocyclic polyester oligomers.

(II)

where $R_3$ is defined as above.

As for titanate compounds, tetra(2-ethylhexyl) titanate, tetraisopropyl titanate, tetrabutyl titanate, and titanate compounds with the general formula (III) shown below can be used as polymerization catalysts.

(III)

wherein: each $R_4$ is independently an alkyl group, or the two $R_4$ groups taken together form a divalent aliphatic hydrocarbon group; $R_5$ is a $C_{2-10}$ divalent or trivalent aliphatic hydrocarbon group; $R_6$ is a methylene or ethylene group; and n is 0 or 1.

Typical examples of titanate compounds with the above general formula are shown in Table 1.

TABLE 1

Examples of Titanate Compounds Having Formula (III)

| | |
|---|---|
| Di-1-butyl 2,2-dimethylpropane-1,3-dioxytitanate | Di-1-butyl 2,2-diethylpropane-1,3-dioxytitanate |
| Di-1-butyl 2(1-propyl)-2-methylpropane-1,3-dioxytitanate | Di-1-butyl 2-ethylhexane-1,3-dioxytitanate |
| Di(2-ethyl-1-hexyl) 2,2-dimethyl-propane-1,3-dioxytitanate | Di(2-ethyl-1-hexyl) 2,2-diethyl-propane-1,3-dioxytitanate |
| Di(2-ethyl-1-hexyl) 2-(1-propyl)-2-methylpropane-1,3-dioxytitanate | Di(2-ethyl-1-hexyl) 2-ethyl-hexane-1,3-dioxytitanate |
| Di(2-ethyl-1-hexyl) 2-(1-butyl)-2-ethylpropane-1,3-dioxytitanate | |

Titanate ester compounds having at least one moiety of the following general formula have also been used as polymerization catalysts:

(IV)

(V)

wherein: each $R_7$ is independently a $C_{2-3}$ alkylene group; $R_8$ is a $C_{1-6}$ alkyl group or unsubstituted or substituted phenyl group; Z is O or N; provided when Z is O, m=n=0, and when Z is N, m=0 or 1 and m+n=1; each $R_9$ is independently a $C_{2-6}$ alkylene group; and q is 0 or 1.

Typical examples of such titanate compounds are shown below as formula (VI) and formula (VII):

(VI)

(VII)

Other polymerization catalysts which may be used in the blend materials of the invention include aryl titanates, described, for example, in co-owned U.S. patent application Ser. No. 10/102,162, published as U.S. Patent Application Publication No. US 2003/0195328, the text of which is incorporated by reference herein in its entirety. Also, polymer-containing organo-metal catalysts may be used in the blend materials of the invention. These include the polymer-containing catalysts described in co-owned U.S. patent application Ser. No. 10/040,530, published as U.S. Patent Application Publication No. US 2003/0162654, the text of which is incorporated by reference herein in its entirety.

III. High Molecular Weight Polymer

Another ingredient of the blend material of the invention is a high molecular weight polymer. High molecular weight polymers of the invention include, but are not limited to, polymers having weight average molecular weights of at least about 5000, of at least about 50,000, within a range from about 5000 to about 150,000, within a range from about 10,000 to about 150,000, and polymers within a range from about 80,000 to about 120,000. The high molecular weight polymers used in the invention can be linear, branched, and/or cross-linked. The high molecular weight polymer may be introduced to the blend material of the invention by itself, or in combination with one or more fillers. The high molecular weight polymer may be non-functionalized or functionalized, and may be either soluble or insoluble in the MPO of the blend.

Examples of high molecular weight polymers suitable for use in the blend materials of the invention include (without limitation) polyesters, copolyetheresters, poly(vinyl butyral), acrylic polymers, and copolymers thereof. The high molecular weight polymer may be provided as an isolated species or as part of a mixture of polymers and/or fillers. The high molecular weight polymer may be, for example, a resin. Resins include, for example, thermoplastic materials such as polyvinyl, polystyrene, polyethylene, and thermosetting materials such as polyesters and epoxies.

Examples of high molecular weight polymers suitable for use in the blend materials of the invention include (without limitation) MBS core-shell copolymers (for example, Paraloid® EXL-2691 from Rohm and Haas Company of Philadelphia, Pa.), core-shell copolymers containing a styrene-acrylonitrile shell, ethylene copolymers (for example, Elvaloy® PTW and Fusabond® from DuPont of Wilmington, Del.), thermoplastic elastomers (for example, Hytrel® from DuPont and Kraton® from Shell Oil Company of Houston, Tex.), ABS acrylate-based modifiers (for example, Durastrength® 400R from Atofina Chemicals, Inc., of Philadelphia, Pa.), acrylic-based rubbers (for example, Blendex® from GE Company, GE Plastics, of Pittsfield, Mass.), and functionalized polyolefin modifiers (such as Lotader® and Lotryl® from Atofina), terpolymers of ethylene, butylacrylate (BA) and glycidylmethacrylate (E/nBA/GMA) (for example, Elvaloy® PTW), polyolefins and copolymers grafted with maleic anhydride, for example, DuPont™ Fusabond® resins, Copolymers of ethylene Butyl Acrylate (EBA) and of Ethylene-Methyl Acrylate (EMA), such as LOTRYL® by Atofina, and other acrylic derivatives, resins with glycidyl methacrylate (GMA) or maleic anhydride (MAH) groups, such as Lotader® Resins by Atofina, epoxy-functionalized alcohols, diols and polyols, such as HELOXY® Epoxy Modifiers by Resolution Performance Products of Houston, Tex., and maleic anhydride functionalized elastomeric ethylene copolymers, such as Exxelor® Modifiers by ExxonMobil Chemical Company of Houston, Tex.

IV. The Blend Material

The invention provides a blend material that includes a macrocyclic polyester oligomer, a high molecular weight polymer, and a polymerization catalyst. In a preferred embodiment, the blend material is a friable solid under ambient conditions and is, therefore, easy to store, transport, and process. Although dependent upon the particular composition of the blend material, blend materials of the invention exhibit a shelf life of at least a week, and preferably at least a month, and more preferably at least a year, when stored under ambient conditions.

From the standpoint of applications, the blend material is a friable, one-component, ready-to-polymerize mixture. The blend material may also be processed as a thermoset in the production of a thermoplastic. Because the blend material is a one-part, ready-to-polymerize mixture, there is no need to modify existing processing equipment to allow for transfer of the macrocyclic polyester oligomer and polymerization catalyst into the equipment in the appropriate amounts at the appropriate times and at the appropriate temperatures. Furthermore, because the melt viscosity of the blend material is within an appropriate range at processing temperatures, it is possible to use the blend in processes such as rotational molding and powder coating, where the melt viscosity of the MPO alone (without the high molecular weight polymer) is too low.

The blend material of the present invention may be used in any combination of one or more processes, for example (and without limitation), rotational molding, powder coating, low-pressure molding, gas-assist molding, short-shot molding, co-injection molding, reaction-injection molding, blow molding, and thermoforming. Various processes are described in co-owned U.S. Pat. No. 6,369,157, by Winckler et al., and co-owned U.S. Pat. No. 6,420,047, by Winckler et al, the texts of which are incorporated by reference herein in their entirety. These patents also provide details regarding macrocyclic oligoesters, fibers, fillers, polymerization catalysts, and other items that may be used as part of or in combination with this invention. The blend material as described herein may be used in combination with any of the processes and/or materials described in the above-referenced patents. Articles of manufacture produced using the blend materials described herein are contemplated to be within the scope of the invention.

A blend material comprising a macrocyclic polyester oligomer, a high molecular weight polymer, and a polymerization catalyst may be prepared by any suitable blending method. In one embodiment, an intimate physical mixture of the MPO and high molecular weight polymer is obtained.

The ingredients of the blend material may be introduced in any order. Preferably, the MPO and high molecular weight polymer are melt-mixed prior to introduction of the polymerization catalyst. For example, in one embodiment, the MPO and high molecular weight polymer are mixed at a first temperature, then the mixture of MPO and high molecular weight polymer is cooled before introduction of the polymerization catalyst. Melt-mixing of MPO and high molecular weight polymer at a higher temperature allows for faster mixing and may result in a more intimate mixture of MPO and polymer. Introduction of the catalyst into the blend at a lower temperature prevents or reduces premature initiation of MPO polymerization. Alternatively, the MPO, high molecular weight polymer, and polymerization catalyst may be introduced together; a mixture of the MPO and the catalyst may be blended with the high molecular weight polymer; or a mixture of the high molecular weight polymer and the catalyst may be blended with the MPO. In one embodiment, the catalyst itself comprises polymeric units which function as the high molecular weight polymer of the blend material of the invention.

In a preferred embodiment, the high molecular weight polymer and the macrocyclic polyester oligomer are mixed via melt-mixing, in which the high molecular weight polymer is contacted with at least partially molten macrocyclic polyester oligomer. Contact of the MPO and high molecular weight polymer may be combined with mixing, extrusion, or any other process that enhances the dispersion of high molecular weight polymer into MPO. In one embodiment, "melt-mixing" occurs as a mixture of MPO and high molecular weight polymer is extruded, and the extrudate is quenched.

The proportions of macrocyclic polyester oligomer and high molecular weight polymer in the blend materials of this invention are subject to wide variation. In general, the high molecular weight polymer will be present in the blend material in an amount from about 1 weight percent or less to about 50 weight percent or more, and preferably from about 3 weight percent to about 30 weight percent, and more preferably from about 5 weight percent to about 25 weight percent.

Addition of the high molecular weight polymer may take place at a temperature in which all, substantially all, or a portion of the macrocyclic oligoester melts. In one embodiment, heat is supplied to melt the MPO at a temperature within a range of about 130° C. to about 250° C., or preferably a range of about 160° C. to about 220° C., or more preferably a range of about 180° C. to about 200° C. In one embodiment, heat is supplied to melt the MPO at a temperature of about 190° C. The temperature used depends, for example, upon the melting range of the MPO used, the amount of high molecular weight polymer to be mixed with the MPO, and the mixing method used. The exemplary temperature ranges given here are particularly applicable for the use of an MPO containing a substantial proportion of macrocyclic poly(butylene terephthalate) oligomer, as described in the illustrative experimental examples herein below. The MPO may be melted before or after contact with the high molecular weight polymer. The high molecular weight polymer may or may not dissolve in the mixture.

In one embodiment, the mixture of MPO and high molecular weight polymer is cooled to a temperature at which at least a portion of the MPO remains melted, prior to or during introduction of the polymerization catalyst. In one embodiment of the invention, the amount of polymerization catalyst employed is generally about 0.01 to about 10.0 mole percent, preferably about 0.1 to about 2 mole percent, and more preferably about 0.2 to about 0.6 mole percent based on total moles of monomeric repeat units of the macrocyclic polyester oligomer. The temperature of the mixture of MPO and high molecular weight polymer may be decreased, for example, by an amount anywhere from about 10° C. to about 70° C., or preferably by an amount from about 30° C. to about 50° C., following (or during) mixing of the MPO and high molecular weight polymer, and prior to addition of the polymerization catalyst. In one embodiment, physical mixing is performed to incorporate the polymerization catalyst in the blend material. The blend material cools to form a stable, friable, one-part, ready-to-polymerize solid. The solid may be processed into any convenient form, for example, via grinding, crumbling, sheeting, pelletizing, and/or powdering.

Even though the blend material contains a catalyst, it remains stable at ambient conditions for at least about a week, and, preferably remains stable for at least about a month, a year, or longer, under ambient conditions.

A blend material that includes an MPO, a high molecular weight polymer, and a polymerization catalyst has a higher melt viscosity than the macrocyclic polyester oligomer it contains. Factors that influence the melt viscosity of the resulting blend material include, for example, the type and molecular weight of the high molecular weight polymer, as well as the proportion of the high molecular weight polymer in the blend material. In one embodiment, the blend material has a viscosity, for example, within a range from about 100 cP to about 100,000 cP at 190° C., within a range from about 1000 cP to about 100,000 cP at 190° C., within a range from about 5000 cP to about 50,000 cP at 190° C., and/or within a range from about 10,000 cP to about 25,000 cP at 190° C. In one embodiment, the blend material has a viscosity within a range from about 600 cP to about 30,000 cP at 150° C., within a range from about 200 to about 16,000 cP at 170° C., within a range from about 100 to about 10,000 cP at 190° C., and/or within a range from about 50 cP to about 6,500 cP at 210° C.

In preferred embodiments of the invention, polymerized products of a blend material comprising a macrocyclic polyester oligomer, a high molecular weight polymer, and a polymerization catalyst exhibit improved properties such as improved toughness, strength, ductility, durability, elastic modulus, and impact resistance.

Certain aspects of blend materials of the invention will be more clearly understood with reference to the illustrative examples described in the Experimental Examples section below.

In one embodiment, the blend material is polymerized at a temperature within a range of about 130° C. to about 250° C., about 140° C. to about 230° C., about 150° C. to about 210° C., about 160° C. to about 220° C., or about 180° C. to about 200° C. In one embodiment, the blend material is polymerized at a temperature of about 190° C. The blend material is allowed to polymerize for a period of time up to about 60 minutes, up to about 30 minutes, preferably up to about 20 minutes, or, more preferably, up to about 10 minutes. In preferred embodiments, polymerization is completed in less than about 10 minutes, or, more preferably, in less than about 5 minutes.

Polymerization of the blend material may take place in any manufacturing process including, for example, a rotational molding process, a powder coating process, a low-pressure molding process, a gas-assist molding process, a short-shot molding process, a co-injection molding process, a reaction-injection molding process, a blow molding process, a thermoforming process, or combinations thereof. The manufacturing process may be a batch process, or it may be a continuous or semi-continuous process.

V. Rotational Molding

Figure 1:
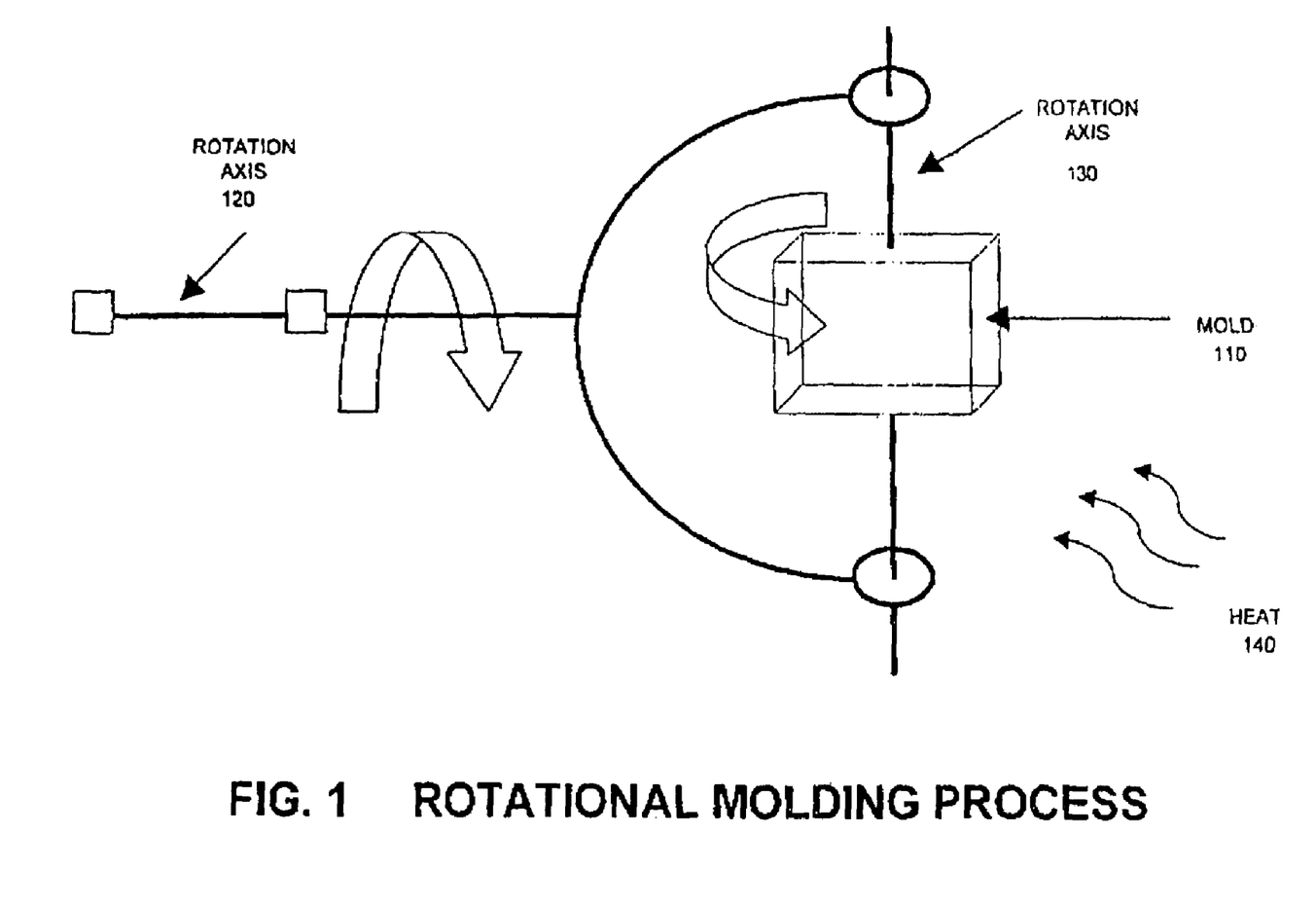
FIG. 1 is a schematic illustration of an embodiment of the invention including a rotational molding process.

FIG. 1 illustrates a rotational molding process in which a blend material is used, according to an embodiment of the invention. Rotational molding is typically performed in manufacturing hollow thermoplastic articles. Examples of such articles are many and varied and include, for example, fluid storage vessels, automobile parts, tractor fenders, and children's toys, to name a few. In one aspect of the invention, rotational molding is used to manufacture articles from a friable blend material comprising an MPO, a high molecular weight polymer, and a polymerization catalyst. Typically, the process begins by placing the blend material in a mold 110. After the mold 110 is closed, it is rotated about two axes 120, 130 simultaneously so that the contents are spread over the intended areas of the inside of the mold. Heat 140 is applied to melt the blend material. After the blend material is melted, the rotation continues until the content polymerizes and solidifies. It should be noted that in certain embodiments, polymerization may begin before the blend is completely melted. The part is demolded while the tools are hot or after some cooling of the tools. The process can then be repeated with the same equipment to produce another thermoplastic part. The rotation rates about the axes may be controlled to provide a uniform coverage inside the mold. Heat can be applied in the form of external gas flames, but internal electrical mold heating can be used alternatively or additionally. One type of mold is made of aluminum with a wall thickness of ¼ of an inch. The mold may be made of other types of material as well, for example, the mold may be made of fiber reinforced plastic.

In one embodiment of the invention, a process for polymerizing a macrocyclic polyester oligomer includes providing a blend material having a macrocyclic polyester oligomer, a polymerization catalyst, and a high molecular weight polymer, loading the blend material into a mold having a chamber, rotating the mold along at least one axis, and heating the mold or otherwise increasing the temperature of the blend material to cause polymerization. In one embodiment, the process also includes the step of removing the resulting polymerized material while it remains substantially at polymerization temperature, and the polymerized material solidifies into a solid at the polymerization temperature.

In one embodiment, the blend material is fed into a cool mold. In another embodiment, the blend material is fed into a hot mold with the temperature of the mold being substantially the same as the polymerization temperature. In one embodiment, the mold is not cooled before the start of the next processing round. In another embodiment, the mold temperature is cooled before the next round of processing. In one embodiment, the mold is rotated along one axis. In another embodiment, the mold is rotated along two or more axes.

In one embodiment, the blend material processed by rotational molding includes a macrocyclic PBT oligomer. A macrocyclic PBT oligomer has a melting point at about 180° C., which is much lower than the melting point of polymerized PBT, which is about 220° C. As a result, the polymerized PBT solidifies and can be removed from the mold at approximately the temperature at which polymerization is conducted.

In another embodiment, the blend material includes macrocyclic PBT/PET co-oligomer. Macrocyclic PBT/PET co-oligomers have a melting point at about 180° C., which is much lower than that of the polymerized PBT/PET. Polymerized PBT/PET melts at about 220° C. to 240° C. depending on the PBT/PET ratio. As a result, the polymerized PBT/PET crystallizes and can be removed from the mold at the temperature at which polymerization is conducted.

In one embodiment, a filler is placed into the mold in which it is mixed with the macrocyclic polyester oligomer and the polymerization catalyst. In another embodiment, a filler is part of the blend material.

VI. Powder Coating

Figure 2:
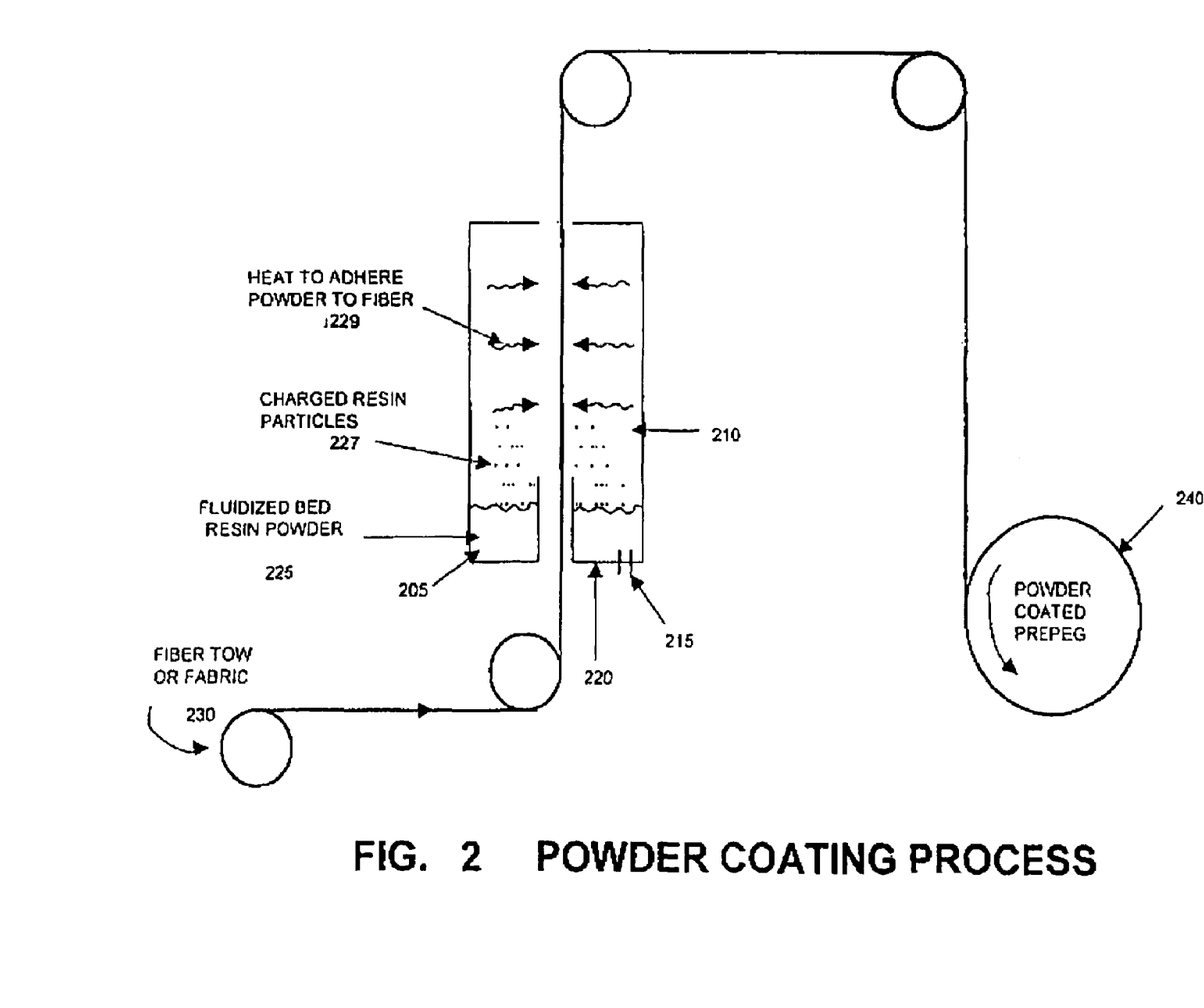
FIG. 2 is a schematic illustration of an embodiment of the invention including a powder coating process.

FIG. 2 illustrates a powder coating process in which a blend material can be used, according to an embodiment of the invention. Powder coatings may or may not be electrostatically applied to a substrate. The powder coating process illustrated in FIG. 2 involves placing a powder 205 in a chamber 210 that has small holes 215 in the bottom 220 through which air (or other gases) are forced. As the gas passes through the powder it begins to bubble and flow like a fluid; this is known as a fluidized bed 225. The powder particles in the fluidized bed 225 may be electrostatically charged, forming charged resin particles 227 that adhere electrostatically, upon heating within a heating zone 229, onto a solid substrate that passes through the charged fluidized powder. The solid substrate may be a fiber tow or fabric 230. The fiber tow or fabric is then rolled onto a roller 240.

In another embodiment, charged powder is sprayed through a nozzle, where the powder includes a blend material having an MPO, a polymerization catalyst, and a high molecular weight polymer. The powder particles adhere electrostatically to the sold substrate used to receive them. In one embodiment, charged powder particles are sprayed using an electrostatic powder spraying technique. In one embodiment, the powder is stored in a reservoir with caking being prevented by slow stirring with an agitator. Slow stirring may not be required for certain powdered blend materials. In another embodiment, air fluidization of the bed is used as an alternative to mechanical stirring. The powder is conveyed to the electrostatic spray head by air motion. In one embodiment, the spray head is fastened onto a gun-like holder for convenience of operation. An orifice is fitted onto the spray head. Before the powder particles leave the orifice, they are electrostatically charged by internal electrodes connected to a high-tension generator. The target substrate to be sprayed with the powder is attached to an electrically grounded holder. The powder is projected towards the target by the flow of air. The target is electrically grounded so that the powder particles will adhere during subsequent operations where the sprayed sheets must be handled. The thickness of the powder layer may be a function of the total charge of powder deposited on the target, which in turn is a function of the voltage applied.

In one embodiment, a substantially uniform powder coating is applied onto a receiving substrate. Illustrative examples of receiving substrates include paper, metals, plastics, carbon, glass, and aramid fibers. The receiving substrate is usually moving in a continuous process. The powder is heated or treated in other ways to make the powder adhere to or soak into the receiving substrate. Thermoset resin powders may be applied to a variety of fibrous materials to make prepregs or coatings for paper or metals. Thermoplastic powders are used to create prepregs in an attempt to get a better connection between the reinforcing fibers and thermoplastic matrix. Still, even powder coated thermoplastic prepregs are difficult to use because conventional thermoplastic materials have high melt viscosity and do not wet out fibers well and have long heat up and cool down cycles when making parts. Thus, conventional thermoplastic materials are difficult to use to produce high quality composites.

In one embodiment, a blend material containing a macrocyclic polyester oligomer, a polymerization catalyst, and a high molecular weight polymer is used in a powder coating system, for example, in an electrostatic powder coating process. The MPO melts slightly and adheres to the fiber, forming a prepreg in an uncured state. Such a prepreg is then processed under heat and/or pressure to allow the resin to flow and to polymerize, thereby producing high quality composites with good surface finish and fiber wet out. The low melt viscosity of macrocyclic polyester oligomers allow them to be processed like a thermoset, although they can produce thermoplastics.

VII. Experimental Examples

Examples of the addition of a high-molecular weight polymer into MPO to produce blend materials with increased viscosity were performed with various linear and cross-linked polymers. Examples 1–5 illustrate methods of producing blends of MPO and high molecular weight polymer and demonstrate the increased viscosity and high friability of blends of MPO and high molecular weight polymer. Examples 6–8 illustrate methods of producing blends of MPO, high molecular weight polymer, and polymerization catalyst. These blends are then polymerized to demonstrate the satisfactory percent conversion, polymerization rate, and resulting polymer molecular weights achieved using the friable, one-component, ready-to-polymerize blends. Examples 9 and 10 illustrate methods of dispersing and polymerizing blends of MPO, high density polyethylene (HDPE), and polymerization catalyst via extrusion. The blend materials in Examples 9 and 10 are not prepared via melt-mixing, but instead are prepared via tumble-mixing at ambient conditions. These blends are then fed into a twin-screw extruder, where the MPO melts and dissolves into the high-density polyethylene as it polymerizes. High conversion of MPO into polymerized product is achieved. In one embodiment of the invention, conversions of MPO into polymerized product of about 80% or higher are achieved; in other embodiments, conversions of about 85% or higher, about 90% or higher, and about 95% or higher are achieved.

Examples 1–10 employ the use of a macrocyclic polyester oligomer manufactured by Cyclics Corporation of Schenectady, N.Y., that is primarily composed of macrocyclic poly(1,4-butylene terephthalate) oligomer. The MPO used in Examples 1–10 is referred to herein as MPO-1 and contains about 95 mole percent (1,4-butylene terephthalate) units and about 5 mole percent (ethylene terephthalate) units. MPO-1 contains about 40.2 wt. % dimer species, about 39.0 wt. % trimer species, about 5.5 wt. % tetramer species, about 12.9 wt. % pentamer species, and about 2.4 wt. % higher oligomer species.

In one embodiment of the invention, the MPO of the blend material is a composition comprising from about 30 to about 45 wt. % dimer species, from about 30 to about 45 wt. % trimer species, from about 0 to about 10 wt. % tetramer species, and from about 5 wt. % to about 20 wt. % pentamer species. MPO formulations outside these ranges may be used, as well. Certain embodiments of the invention may include modifying compositions of MPO's. Various methods of modifying compositions of MPO's are described in co-owned U.S. Pat. No. 6,436,548, by Phelps, the text of which is incorporated by reference herein in its entirety.

EXAMPLE 1

A first formulation containing 5 wt. % poly(vinyl butyral-co-vinyl alcohol-co-vinyl acetate) was prepared by melt mixing 24.0 grams of MPO-1 and 6.0 grams of poly(vinyl butyral-co-vinyl alcohol-co-vinyl acetate) (Mw=100,000, 80 wt. % vinyl butyal, 18–20 wt. % vinyl alcohol and 0–1.5 wt. % vinyl acetate). The two ingredients were added to a 100 mL three-neck round-bottomed flask equipped with a mechanical stirrer and nitrogen/vacuum inlet. The flask was then immersed into an oil bath preheated to 190° C. Upon heating, the MPO-1 melted and the high molecular polymer dissolved in the molten MPO-1 to form a clear viscous solution. The solution was subsequently dried under vacuum at 190° C. for 5 minutes and then poured into an aluminum tray. The tray was cooled in an 80° C. oven for 30 minutes to allow the mixture to solidify. The solidified material was ground to produce a friable MPO formulation containing about 20 wt. % poly(vinyl butyral-co-vinyl alcohol-co-vinyl acetate).

EXAMPLE 2

A second formulation (Example 2) containing 20 wt. % poly(butyl methacrylate-co-methyl methacrylate) was prepared by melt mixing 24.0 grams of CBT® and 6.0 grams of poly(butylmethacrylate-co-methyl methacrylate) (Mw=100,000, the molar ratio of butyl methacrylate and methyl methacrylate is 1.4). The two ingredients were added to a 100 mL three-neck round-bottomed flask equipped with a mechanical stirrer and nitrogen/vacuum inlet. The flask was then immersed into an oil bath preheated to 190° C. Upon heating, the MPO-1 melted and the high molecular polymer dissolved in the molten MPO-1 to form a clear viscous solution. The solution was subsequently dried under vacuum at 190° C. for 5 minutes and then poured into an aluminum tray. The tray was cooled in an 80° C. oven for 30 minutes to allow the mixture to solidify. The solidified material was then ground to produce a friable two-part MPO formulation containing 20 wt. % poly(butyl methacrylate-co-methyl methacrylate).

EXAMPLE 3

A third formulation (Example 3) containing 20 wt. % poly[butylene terephthalate-co-poly(alkylene glycol) terephthalate] was prepared by melt mixing 40.0 grams of MPO-1 and 10.0 grams of Hytrel® 4056 (DuPont product). The two ingredients were added to a 100 mL three-neck round-bottomed flask equipped with a mechanical stirrer and nitrogen/vacuum inlet. The flask was then immersed into an oil bath preheated to 190° C. Upon heating, the MPO-1 melted and the high molecular polymer dissolved in the molten MPO-1 to form a clear viscous solution. The solution was subsequently dried under vacuum at 190° C. for 5 minutes and then poured into an aluminum tray. The tray was cooled in an 80° C. oven for 30 minutes to allow the mixture to solidify. The solidified material was then ground to produce a friable two-part MPO formulation containing 20 wt. % Hytrel® 4056.

EXAMPLES 4 and 5

A fourth and fifth formulations were prepared in the same manner as Example 3 described above, except the amount of Hytrel® 4056 added to the MPO-1 was 10 and 5 wt % respectively (e.g., 5.0 grams of Hytrel® 4056 was melt-mixed with 45.0 grams of MPO-1 to produce the 10 wt. % formulation; 2.5 grams of Hytrel® 4056 was melt-mixed with 47.5 grams of MPO-1 to produce the 5 wt. % formulation).

All five formulations obtained from Examples 1–5 were very friable at room temperature and could be easily ground into fine powder using a coffee grinder. Rheology testing was conducted to determine their melt viscosities at 150° C., 170° C., 190° C., and 210° C. Results from these tests are reported in Table 2. Each of the formulations demonstrates increased melt viscosity compared to the viscosity of unfilled MPO-1 at the same temperature.

TABLE 2

Viscosity of Macrocyclic Oligoester Blends with High Molecular Weight Polymers at Various Temperatures (Shear Rate of 10 $s^{-1}$)

| Sample ID | Viscosity at 150° C. (cP) | Viscosity at 170° C. (cP) | Viscosity at 190° C. (cP) | Viscosity at 210° C. (cP) |
|---|---|---|---|---|
| Unfilled MPO-1 | 95 | 55 | 30 | 20 |
| Example 1 | 12,000 | 4,400 | 1,800 | 850 |
| Example 2 | 820 | 400 | 300 | 100 |
| Example 3 | 28,800 | 15,100 | 8,900 | 6,100 |
| Example 4 | 1,620 | 810 | 450 | 300 |
| Example 5 | 500 | 230 | 130 | 100 |

EXAMPLE 6

A sixth formulation containing 10 wt. % poly(vinyl butyral-co-vinyl alcohol-co-vinyl acetate) was prepared by melt mixing 45.0 grams of MPO-1 and 5.0 grams of poly (vinyl butyral-co-vinyl alcohol-co-vinyl acetate) (Mw=100,000, 80 wt. % vinyl butyal, 18–20 wt. % vinyl alcohol and 0–1.5 wt. % vinyl acetate). The two ingredients were added to a 100 mL three-neck round-bottomed flask equipped with a mechanical stirrer and nitrogen/vacuum inlet. The flask was then immersed into an oil bath preheated to 190° C. Upon heating, the MPO-1 melted and the high molecular polymer dissolved in the molten MPO-1 to form a clear viscous solution. The solution was subsequently dried under vacuum at 190° C. for 5 minutes, then cooled to 170° C. whereupon 0.1 grams of butyltin chloride dihydroxide was added. After 3 minutes of mixing under vacuum, the clear viscous solution was poured into an aluminum tray and cooled in an 80° C. oven for 30 minutes to allow the mixture to solidify. The solidified material was then ground to produce a friable non-polymerized one-part MPO formulation containing 0.20 mol % tin catalyst based on the molar amount of repeat units in MPO-1.

EXAMPLE 7

A seventh formulation containing 10 wt. % Hytrel® 4056 was prepared by melt mixing 45.0 grams of MPO-1 and 5.0 grams of poly[butylene terephthalate-co-poly(alkylene glycol) terephthalate] at 190° C. The two ingredients were added to a 100 mL three-neck round-bottomed flask equipped with a mechanical stirrer and nitrogen/vacuum inlet. The flask was then immersed into an oil bath preheated to 190° C. Upon heating, the MPO-1 melted and the high molecular polymer dissolved in the molten MPO-1 to form a clear viscous solution. The solution was subsequently dried under vacuum at 190° C. for 5 minutes, then cooled to 170° C. whereupon 0.1 grams of butyltin chloride dihydroxide was added. After 3 minutes of mixing under vacuum, the clear viscous solution was poured into an aluminum tray and cooled in an 80° C. oven for 30 minutes to allow the mixture to solidify. The solidified material was then ground to produce a friable non-polymerized one-part MPO formulation containing 0.20 mol % tin catalyst based on the molar amount of MPO monomer repeat units.

EXAMPLE 8

An eighth formulation containing 10 wt. % Paraloid® EXL-2691 (manufactured by Rohm and Hass Company of Philadelphia, Pa.) was prepared by melt mixing 48.0 grams of MPO-1 and 5.33 grams of Paraloid® EXL-2691 at 190° C. The two ingredients were added to a 100 mL three-neck round-bottomed flask equipped with a mechanical stirrer and nitrogen/vacuum inlet. The flask was then immersed into an oil bath preheated to 190° C. Upon heating, the MPO-1 melted and the high molecular polymer dissolved in the molten MPO-1 to form a clear viscous solution. The solution was subsequently dried under vacuum at 190° C. for 5 minutes, then cooled to 170° C. whereupon 0.107 grams of butyltin chloride dihydroxide was added. After 3 minutes of mixing under vacuum, the cloudy viscous solution was poured into an aluminum tray and cooled in an 80° C. oven for 30 minutes to allow the mixture to solidify. The solidified material was then ground to produce a friable non-polymerized one-part MPO formulation containing 0.20 mol % tin catalyst based on the molar amount of repeat units in MPO-1.

Blend materials obtained in Examples 6–8 were subjected to the following testing procedures. Twelve grams of each sample were placed in a 50 mL one-neck round-bottomed flask. The flask was connected to a rotary evaporator and immersed into an oil bath preheated to 190° C. Under nitrogen atmosphere and a rotational speed of 192 rpm, the fine powder was melted in 5 minutes, and became highly viscous in 10 minutes. Within 20 minutes, the material was solidified. After 40 minutes, the flask was disconnected, and the resulting half-egg shaped hollow part was retrieved by breaking the flask. A small piece of the sample was then analyzed by gel permeation chromatography. The conversion of MPO-1 into polymer product (i.e. conversion of macrocyclic poly(1,4-butylene terephthalate) oligomer to linear PBT) and the molecular weight of the resulting polymer are summarized in Table 3. The data indicate that the blending of high molecular weight polymer fillers with MPO-1 prior to polymerization of the MPO-1 did not negatively affect the polymerization rate. Satisfactory percent conversions and polymerized product molecular weights were achieved.

TABLE 3

Conversion and Molecular Weights of Polymerized Blends Examples 6–8.

| Sample ID | % Polymer | Mn | Mw |
|---|---|---|---|
| Example 6 | 82 | 22,000 | 48,200 |
| Example 7 | 95 | 42,500 | 110,000 |
| Example 8 | 94 | 42,900 | 111,950 |

EXAMPLE 9

A ninth formulation was prepared by tumble-mixing 955.5 grams MPO-1, 2229 grams HDPE (high density polyethylene, octene copolymer, manufactured by Huntsman of Salt Lake City, Utah, having density of about 0.946 g/cm$^3$ and melt index of about 3.0 grams/10 min), and 3.20 grams (0.3 mole percent, based on the molar amount of repeat units in MPO-1) butyldihydroxytin chloride under ambient conditions. The mixture was then dried at 80° C. for 18 to 20 hours in a vacuum oven to remove residual water before extrusion. The pre-blended mixture was fed into a twin-screw extruder. The twin-screw extruder used in Examples 9 and 10 was a Leistritz counter-rotating extruder (34 mm, 28 L/D, 200–290° C. barrel and die temperature) outfitted with a face cutter. The extruder was set at 260–290° C. barrel and die temperature. The screw speed was set at 150 rpm, and the pre-blended mixture was fed via volumetric feeder into the extruder, producing an output of 20 lbs/hr. The melt temperature of the extrudate was approximately 290° C. Upon heating, the MPO-1 melted and dissolved into the HDPE as the MPO-1 polymerized, forming a viscous melt. The melt-compounded extrudate was strand pelletized into a chilled water trough. Analysis of the extrudate by DSC showed a polyethylene melting peak at about 130° C. and a PBT melting peak at about 223° C., but no MPO-1 melting peak from about 140° C. to about 160° C., indicating a high conversion of MPO-1 into polymer product (i.e. an estimated conversion of about 90% or higher).

EXAMPLE 10

A tenth formulation was prepared by tumble-mixing 905 grams MPO-1, 2730 grams high-density polyethylene (HDPE), 920 grams of a preblended mixture of 50 wt. % MPO-1 and 50 wt. % Lotader AX8950 (a random ethylmethacrylate co-glycidyl methacrylate terpolymer impact modifier, manufactured by ATOFINA Chemicals, Inc., of Philadelphia, Pa.), and 4.56 grams (0.3 mole percent, based on the molar amount of repeat units in MPO-1) butyldihydroxytin chloride under ambient conditions. The mixture of 50 wt. % MPO-1 and 50 wt. % Lotader AX8950 was made by dispersing Lotader AX8950 into MPO-1 via twin-screw extrusion, thereby insuring good dispersion of the Lotader compound into MPO-1. The Lotader compound acts as a compatibilizer for MPO-1 and HDPE in this example. The tumble-mixed formulation was dried at 80° C. for 18 to 20 hours in a vacuum oven to remove residual water before extrusion. The formulation was fed into a twin-screw extruder. The extruder was set at 260–290° C. barrel and die temperature. The screw speed was set at 150 rpm, and the pre-blended formulation was fed via volumetric feeder into the extruder, producing an output of 20 lbs/hr. The melt temperature of the extrudate was approximately 290° C. and was strand pelletized into a chilled water trough. Analysis of the extrudate by DSC showed a polyethylene melting peak at about 130° C. and a PBT melting peak at about 223° C., but no MPO-1 melting peak from about 140° C. to about 160° C., indicating a high conversion of MPO-1 into polymer product (i.e. an estimated conversion of about 90% or higher).

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

The invention claimed is:

1. A blend material stable at ambient conditions for at least one week, the blend material comprising:
    (a) a macrocyclic polyester oligomer;
    (b) a polymerization catalyst; and
    (c) a polymer.

2. The blend material of claim 1, wherein the polymer has a weight average molecular weight of at least about 5000.

3. The blend material of claim 1, wherein the polymer has a weight average molecular weight of at least about 50,000.

4. The blend material of claim 1, wherein the polymer has a weight average molecular weight from about 80,000 to about 120,000.

5. The blend material of claim 1, wherein the polymer is selected from the group consisting of a polyester, a copolyester, a poly(vinyl butyral), and an acrylic polymer.

6. The blend material of claim 1, wherein the polymer comprises at least one member selected from the group consisting of a linear species, a branched species, and a cross-linked species.

7. The blend material of claim 1, wherein the polymer comprises at least one member selected from the group consisting of a polyacetal, a polyether, an epoxide resin, a polycarbonate, an alkyd resin, and a polyallyl ester.

8. The blend material of claim 1, wherein the polymer comprises at least one member selected from the group consisting of poly(vinyl butyral-co-vinyl alcohol-co-vinyl acetate), poly(butyl methacrylate co-methyl methacrylate), poly[butylene terephthalate-co-poly(alkylene glycol) terephthalate], and poly(ethyl methacrylate co-glycidyl methacrylate).

9. The blend material of claim 1, wherein the polymer comprises polyethylene.

10. The blend material of claim 1, wherein the polymer comprises polyethylene and at least one additional polymeric species.

11. The blend material of claim 1, wherein the polymer is present in the blend material in an amount up to about 90 weight percent.

12. The blend material of claim 1, wherein the polymer is present in the blend material in an amount up to about 75 weight percent.

13. The blend material of claim 1, wherein the polymer is present in the blend material in an amount up to about 30 weight percent.

14. The blend material of claim 1, wherein the viscosity of the blend material is from about 5 times to about 5000 times the viscosity of the macrocyclic polyester oligomer.

15. The blend material of claim 1, wherein the viscosity of the blend material at about 190° C. is at least about 100 cP.

16. The blend material of claim 1, wherein the viscosity of the blend material at about 190° C. is within a range from about 100 cP to about 100,000 cP.

17. The blend material of claim 1, wherein the polymerization catalyst comprises at least one of a tin compound and a titanate compound.

18. The blend material of claim 1, wherein the polymerization catalyst is present in an amount from about 0.01 to about 10.0 mole percent per monomeric unit of the macrocyclic polyester oligomer.

19. The blend material of claim 1, wherein the blend material is friable.

20. The blend material of claim 1, wherein the blend material is stable at ambient conditions for at least one month.

21. The blend material of claim 1, wherein the blend material is stable at ambient conditions for at least one year.

22. The blend material of claim 1, wherein the macrocyclic polyester oligomer comprises a plurality of species.

23. The blend material of claim 22, wherein the macrocyclic polyester oligomer comprises species having different degrees of polymerization.

24. The blend material of claim 1, wherein the macrocyclic polyester oligomer comprises a butylene terephthalate unit and an ethylene terephthalate unit.

25. The blend material of claim 24, wherein the macrocyclic polyester oligomer comprises about 95 mole percent butylene terephthalate units and about 5 mole percent ethylene terephthalate units.

26. A method for preparing a friable blend material that is stable at ambient conditions for at least about one week, the method comprising:
    contacting a macrocyclic polyester oligomer, a polymer, and a polymerization catalyst at a temperature at which the macrocyclic polyester oligomer at least partially melts.

27. The method of claim 26, wherein the macrocyclic polyester oligomer is at least partially melted prior to the contacting step.

28. The method of claim 26, comprising:
    (a) contacting the macrocyclic polyester and the polymer at a first temperature at which the macrocyclic polyester oligomer melts, thereby forming a mixture;
    (b) cooling the mixture to a second temperature; and
    (c) adding the polymerization catalyst to the mixture.

29. The method of claim 28, comprising:
    solidifying a mixture comprising the macrocyclic polyester oligomer, the polymer, and the polymerization catalyst.

30. The method of claim 28, wherein the first temperature is from about 130° C. to about 250° C.

31. The method of claim 28, wherein the second temperature is from about 10° C. to about 70° C. below the first temperature.

32. A method for polymerizing a macrocyclic polyester oligomer, the method comprising the steps of:
    (a) providing a blend material that is stable at ambient conditions for at least one week, the blend material comprising:
       (i) a macrocyclic polyester oligomer;
       (ii) a polymerization catalyst; and
       (iii) a polymer; and
    (b) heating the blend material to polymerize the macrocyclic polyester oligomer.

33. A manufacturing process comprising the method of claim 32, wherein the manufacturing process comprises a rotational molding process.

34. A manufacturing process comprising the method of claim 32, wherein the manufacturing process comprises a powder coating process.

35. A manufacturing process comprising the method of claim 32, wherein the manufacturing process comprises a member selected from the group consisting of a low-pressure molding process, a gas-assist molding process, a short-shot molding process, a co-injection molding process, a reaction-injection molding process, a blow molding process, a thermoforming process, and combinations thereof.

36. The method of claim 32, wherein the blend material is friable prior to the heating step.

* * * * *